United States Patent
Chang

[19]

[11] Patent Number: 6,161,943
[45] Date of Patent: Dec. 19, 2000

[54] WORKING LAMP WITH WIRE-WINDING DEVICE

[76] Inventor: Wen-Hsiang Chang, No. 1, Alley 36 Lane 121, Te-Lin Road, T'ao-Yuan Hsien, Taiwan

[21] Appl. No.: 09/245,890

[22] Filed: Feb. 8, 1999

[30] Foreign Application Priority Data

Jun. 5, 1998 [TW] Taiwan ................................. 87208929

[51] Int. Cl.[7] .................................................. F21V 21/38
[52] U.S. Cl. .................... 362/258; 362/220; 362/218; 362/223; 362/387; 362/390; 362/396; 362/407
[58] Field of Search .................... 242/397.5; 362/220, 362/223, 258, 369, 387, 390, 396, 403, 407, 294, 218, 373

[56] References Cited

U.S. PATENT DOCUMENTS

| | | | |
|---|---|---|---|
| 685,856 | 11/1901 | Menuez | 362/403 |
| 1,172,875 | 2/1916 | Cook | 362/387 |
| 1,748,601 | 2/1930 | Gottlieb | 362/387 |
| 3,904,843 | 9/1975 | Kendechy | 362/258 |
| 4,378,473 | 3/1983 | Noorigian | 362/387 |
| 5,217,300 | 6/1993 | Lwery | 362/387 |
| 5,436,814 | 7/1995 | Hanley | 362/390 |

FOREIGN PATENT DOCUMENTS

32963  5/1908  Austria ................................. 362/387

*Primary Examiner*—Alan Cariaso
*Attorney, Agent, or Firm*—Bacon & Thomas

[57] ABSTRACT

A working lamp with wire-winding device, including a working lamp, a light shade, a hanging hook body, a wire box and an adjustment ball. The light shade is made of opaque material and fitted on the outer tube. The outer tube with the light shade is passed through the hanging hook body, whereby the working lamp can be conveniently hung or stand in use. The light shade serves to shade the strong light directly projected onto the eyes of a worker. A front, a middle and a rear sections of the working lamp are fitted with collisionproof blocks. A pressing rod and a guide rod are disposed at the wire releasing port of the wire box. The adjustment ball is positioned therebetween. The working lamp is shockproof and collisionproof. When not used, the excessive wire is tidily collected in the wire box and stopped by the adjustment ball with a certain length of wire reserved for the working lamp. The working lamp can be conveniently and mobilely used without occupying much room.

9 Claims, 11 Drawing Sheets

WORKING LAMP WITH WIRE-WINDING DEVICE

BACKGROUND OF THE INVENTION

The present invention relates to a working lamp which can be conveniently and mobilely used without occupying much room. The working lamp is protected by collision-proof blocks from shocking and collision. The wire-winding device serves to smoothly and tidily release and recover the wire. The working lamp is applicable to various working sites necessitating illumination.

A general working lamp is composed of a bulb and a bulb seat in which the bulb is screwed. The bulb seat with the bulb is disposed in a semicircular iron mesh shade having an upward extending hanging hook for hanging the working lamp on a site necessitating illumination to facilitate working.

The iron mesh shade is made of iron string by winding so as not to affect the illumination of the bulb. However, the eyes of a worker are totally exposed to the strong light. The eyes of the worker must stare at the work piece with the strong light directly projected onto the eyes. After a period of time, the worker will be subject to visual diseases such as cataract, glaucoma, etc. Moreover, such working lamp lacks protection and is apt to be damaged due to collision or dropping.

Furthermore, in the case that the working site is relatively large and the electric wire of the working lamp is limited, an extension wire will be necessary. The conventional extension wire is released under control of a one-way ratchet set. However, the teeth of the gear occupy about three fourths of the gear. When recovering the wire, the wire must be further pulled out until exceeding three fourths of the gear so as to retrieve the released wire. The ratchet has a quite great rebounding force so that a user may be incautiously hurt by the quickly retrieved wire. Also, when winding the wire, the sharp edge of the wire releasing port of the wire box may scrape the skin of the wire to cause leakage of electricity. Moreover, the wire tends to be wound on the same side or tangled. This will make it difficult to release the wire.

SUMMARY OF THE INVENTION

It is a primary object of the present invention to provide a working lamp with wire-winding device, which is able to protect the eyes of a worker from strong light.

It is a further object of the present invention to provide the above working lamp which can be hung or solely stand.

It is still a further object of the present invention to provide the above working lamp in which the length of the released wire can be freely adjusted.

It is still a further object of the present invention to provide the above working lamp which is conveniently and mobilely used without occupying much room.

It is still a further object of the present invention to provide the above working lamp which is shockproof and collisionproof.

It is still a further object of the present invention to provide the above working lamp in which the wire can be tidily and smoothly recovered.

It is still a further object of the present invention to provide the above working lamp in which the skin of the wire is protected from being scraped.

According to the above object s, the working lamp of the present invention includes a working lamp, a light shade, a hanging hook body, a wire box and an adjustment ball. The light shade is made of opaque material and fitted on the outer tube. The outer tube with the light shade is passed through the hanging hook body, whereby the working lamp can be conveniently hung or stand in use. The light shade serves to shade the strong light directly projected onto the eyes of a worker. A front, a middle and a rear sections of the working lamp are fitted with collisionproof blocks. A pressing rod and a guide rod are disposed at the wire releasing port of the wire box. The adjustment ball is positioned therebetween. The working lamp is shockproof and collisionproof. When not used, the excessive wire is tidily collected in the wire box and stopped by the adjustment ball with a certain length of wire reserved for the working lamp. The working lamp can be conveniently and mobilely used without occupying much room.

The present invention can be best understood through the following description and accompanying drawings, wherein:

DETAILED DESCRIPTION OF THE PREFERRED EMBODIMENTS

Figure 1:
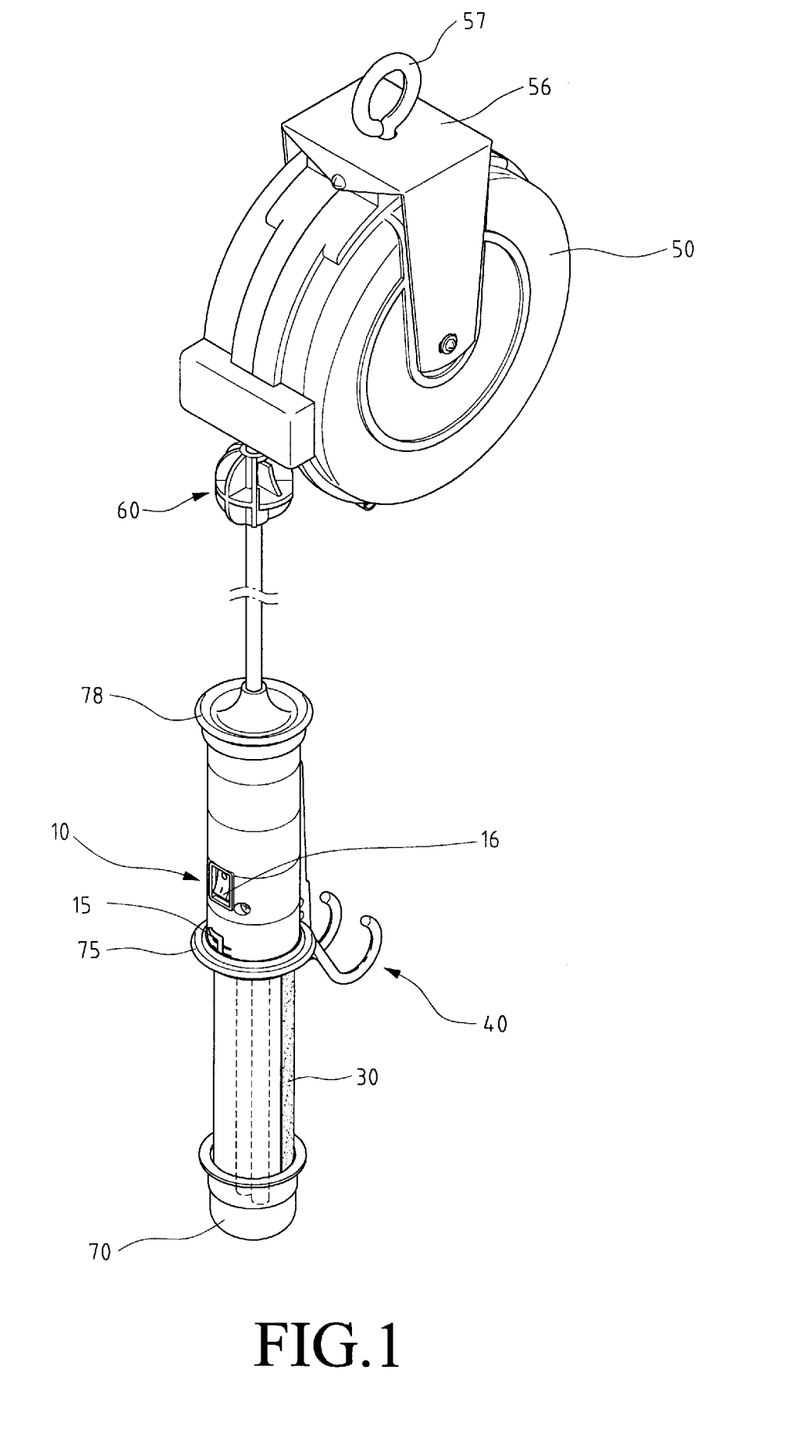
FIG. 1 is a perspective view of the present invention.
Figure 2:
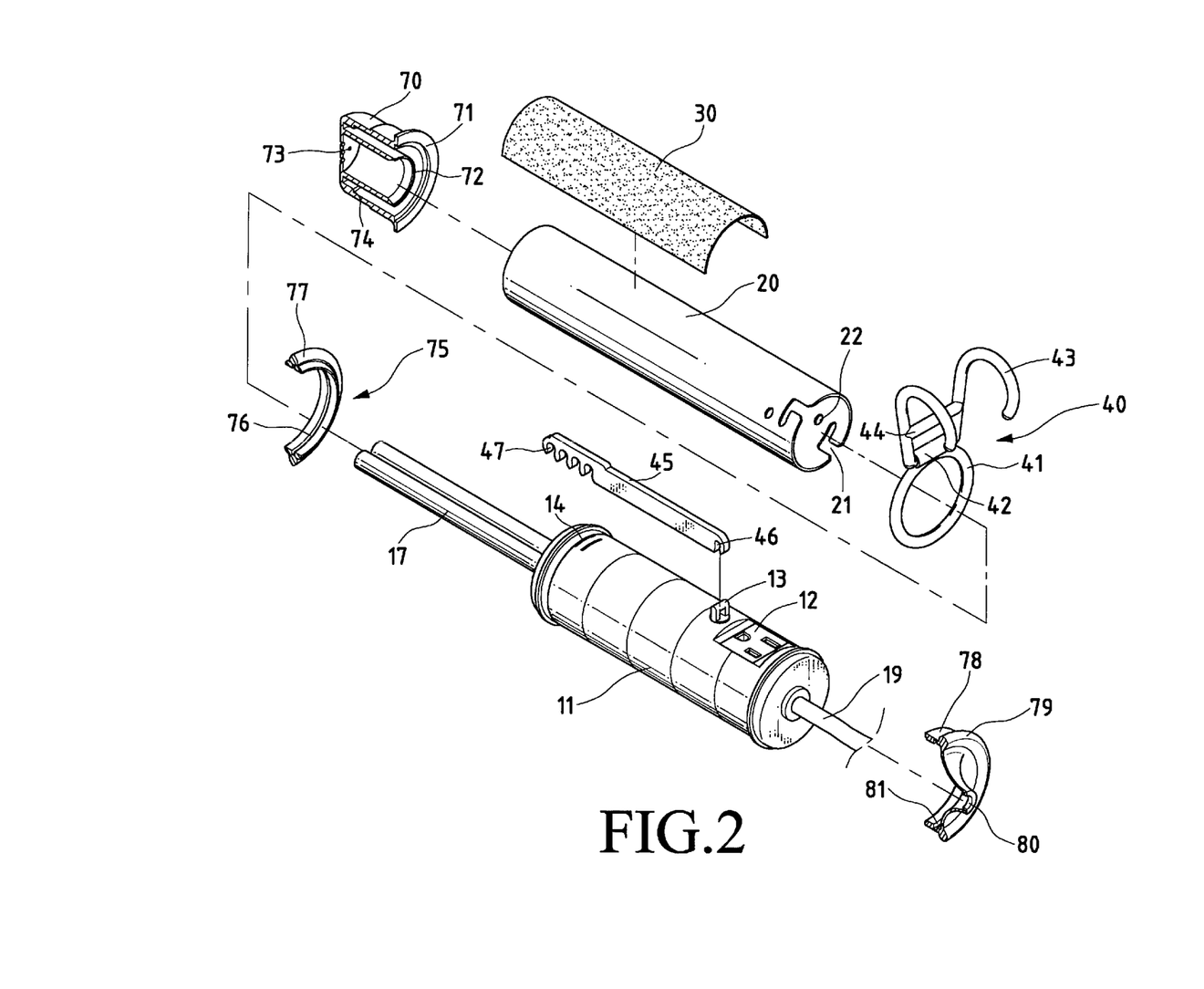
FIG. 2 is a perspective exploded view of the present invention.

Please refer to FIGS. 1 and 2. The working lamp 10 of the present invention includes a lamp seat 11, an outer tube 20, a light shade 30, a hanging hook body 40 and a collisionproof cap 70.

The lamp seat 11 is a cylindrical body. The center of rear end of the lamp seat is connected with an electric wire 19. The lamp seat is disposed with a socket 12 near the rear end. An upper side of the socket 12 is disposed with a U-shaped rotary button 13. An opposite side of the rotary button 13 is disposed with an activation switch 16. Two opposite sides of the lamp seat 10 near the front end thereof are disposed with heat-radiating screens 14. An indication 15 is disposed on one of the heat-radiating screens 14. An inner lower edge of each heat-radiating screen 14 is disposed with a small projection 18. A lamp tube 17 projects from the center of front end of the lamp seat 10.

The outer tube 20 is made of a transparent hollow plastic tube. The opposite sides of rear end of the outer tube 20 are disposed with two reversely directed L-shaped notches 21. An upper edge of the end of each notch 21 is formed with a circular through hole 22.

The collisionproof cap 70 has a diameter corresponding to that of the outer tube 20. The bottom of the collisionproof cap 70 is formed with a flange 71. The collisionproof cap 70 is formed with a downward extending inner tube 72 spaced from inner wall of the collisionproof cap by a certain distance. The top end of the inner tube 72 is formed with multiple ventilators 73. The inner tube 72 and the top end of the inner wall of the cap are disposed with annularly radial stopper plate 74, whereby when fitting with the outer tube 20, the outer tube 20 is engaged with the stopper plate 74.

The light shade 30 is made of opaque material with a certain length. The light shade 30 is a semicircular member having a diameter corresponding to that of the outer tube.

The hanging hook body 40 includes a ring hook 41 and an engaging bar 45. The ring hook 41 has a ring section disposed with a pivot tube 42 for pivotally connecting with two bent hooks 43. The two bent hooks 43 are interconnected by a bridge beam 44. The engaging bar 45 is an elongated flat member. A lower edge of rear end of the engaging bar 45 is formed with a necked insertion notch 46. The front end of the engaging bar 45 is sequentially formed with larger necked adjustment insertion notches 47.

Figure 3:
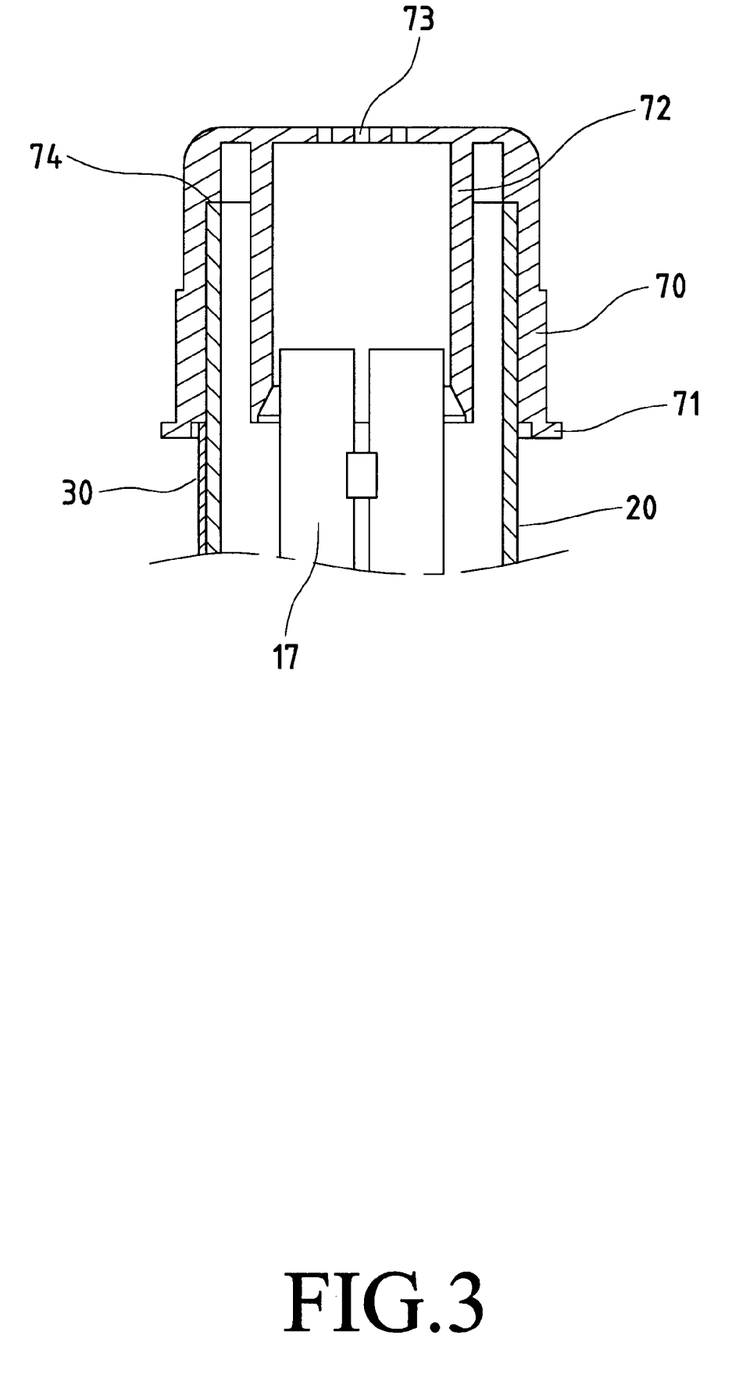
FIG. 3 is a sectional view showing the engagement between the outer tube and the inner tube.
Figure 4:
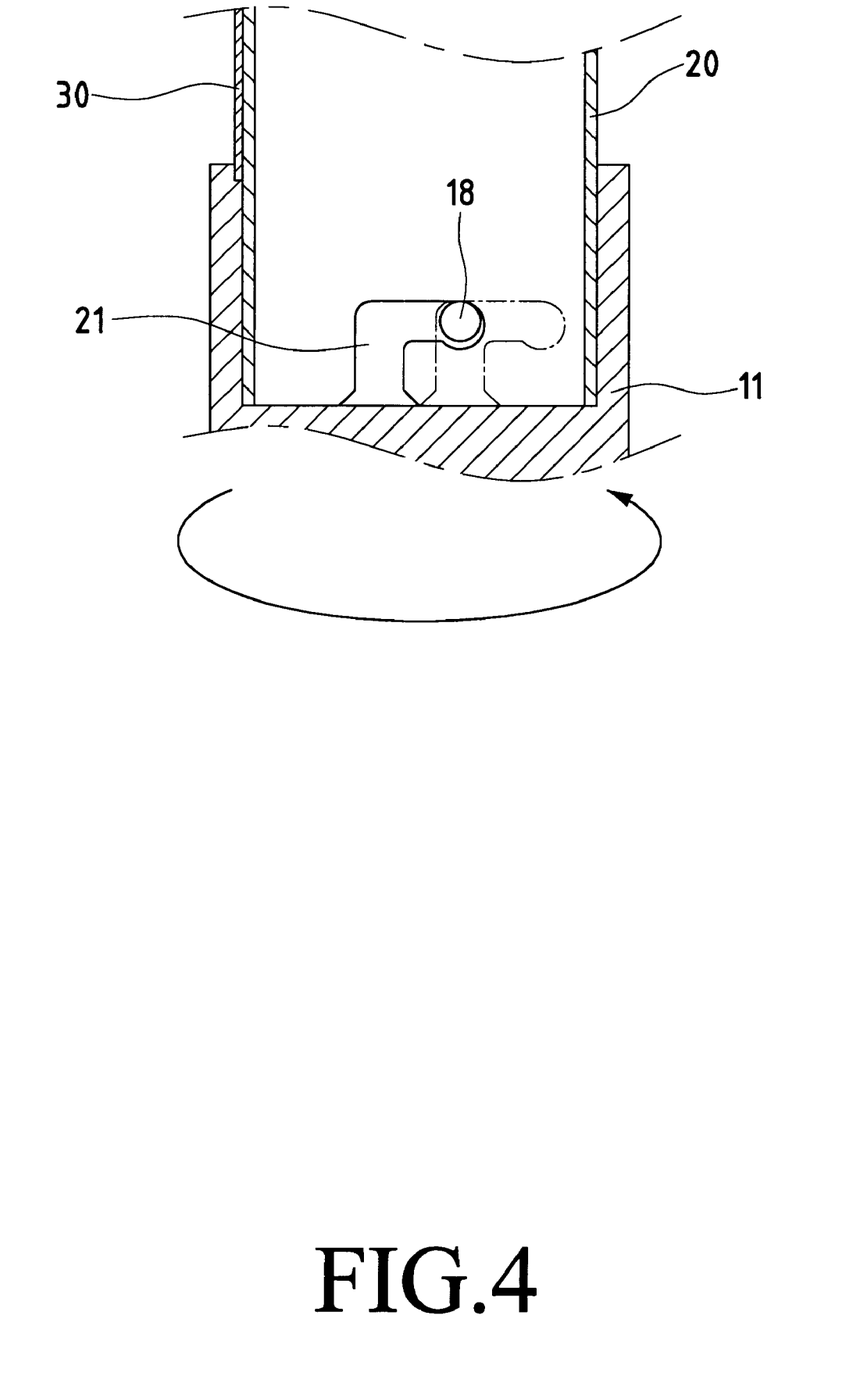
FIG. 4 is a sectional view showing the engagement between the lamp tube, outer tube and collisionproof cap of the present invention.

Referring to FIGS. 1 and 2, the collisionproof cap 70 is fitted with the front end of the outer tube 20. The light shade 30 is attached to the outer tube 20. Then the outer tube 20 with the light shade 30 is passed through the ring section of the ring hook 41. At this time, the lamp tube 17 at front end of the lamp seat 10 is extended into the outer tube 20. The open end of the notch 21 of the outer tube 20 is aligned with the small projection 18 of the lamp seat 10 and fitted therewith to the bottom. Then the outer tube is rotated in the direction of the indication 15 so as to tightly associate the outer tube 20 with the lamp seat 10 ( as shown in FIG. 3 ). At this time, the lamp tube 17 is located in the inner tube 71 of the collisionproof cap 70 (as shown in FIG. 4 ). The notch 46 at the rear end of the engaging bar 45 is inserted with the U-shaped rotary button 13 of the lamp seat 10. The adjustment insertion notches 47 at the front end of the engaging bar can be inserted with the bridge beam 44 of the ring hook 41 as necessary to complete the assembly of the working lamp. Furthermore, in order to avoid damage of the working lamp 10 due to dropping down, a collisionproof collar 75 is fitted on a middle section of the working lamp 10. The collisionproof collar 75 is formed with a projecting rim 77 at the center of outer periphery. The inner side of the rim 77 is formed with an annular groove 76. The bottom of the working lamp is additionally fitted with a collisionproof base seat 78. The inner wall face of the base seat 78 is formed with a groove 81, while a bottom edge of the base seat is formed with a flange 79. The center of the bottom of the base seat 78 is formed with a wire hole 80. In case the working lamp 10 is incautiously dropped in use, no matter which end of the working lamp 10 hits the ground first, the front collisionproof cap 70, the middle collisionproof collar 75 or the rear collisionproof base seat 78 can absorb the impact and shocking force so as to protect the lamp tube and prolong using life of the working lamp.

Figure 7:
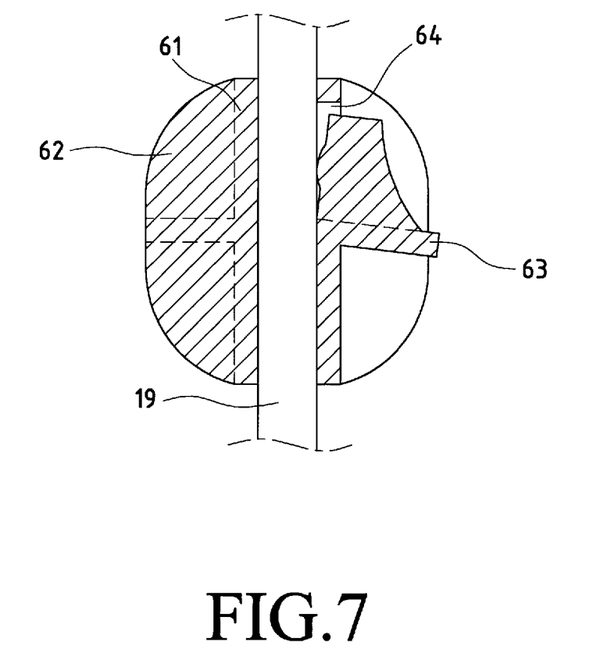
FIG. 7 is a sectional view showing the adjustment ball in one state.
Figure 8:
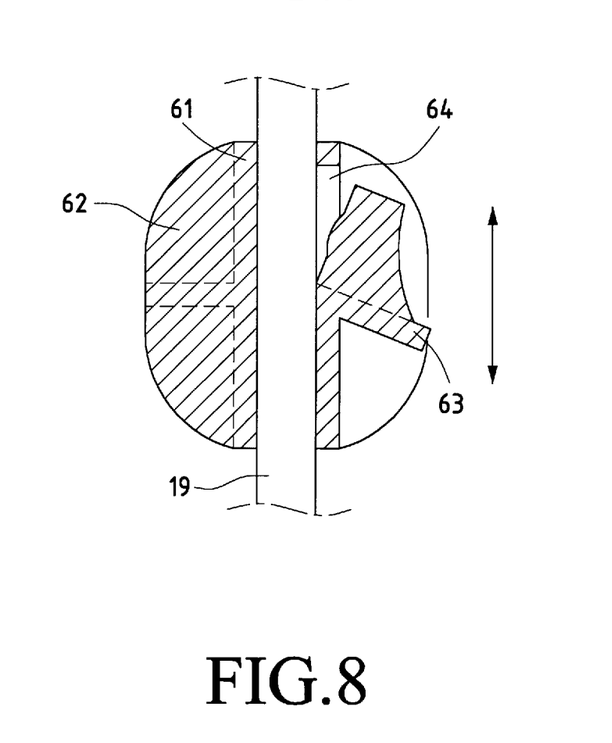
FIG. 8 is a sectional view showing the adjustment ball in another state.

Referring to FIG. 7, after assembled, the electric wire of rear end of the working lamp 10 is passed through an adjustment ball. The remaining electric wire is wound into a wire box 50. The adjustment ball 60 is made of a resilient material as a hollow ball body. The center of the adjustment ball is disposed with a hollow tube 61. The periphery of the hollow tube 61 is disposed with multiple longitudinal sector slats 62 which are connected with diaphragmatic connecting plates. One of the connecting plates is a controlling plate 63 two sides of which are not connected with the sector slats 62. The bottom of front side of the controlling plate 63 is disposed with a hollow section 64. The front end of the controlling plate 63 is disposed with a vertically projecting irregularly shaped engaging block having a flange on the bottom for fixedly engaging with the electric wire. When adjusting the position, the controlling plate 63 is pushed backward, making the engaging block of front end thereof leave the electric wire, permitting the wire to be freely moved (as shown in FIG. 8).

Figure 5:
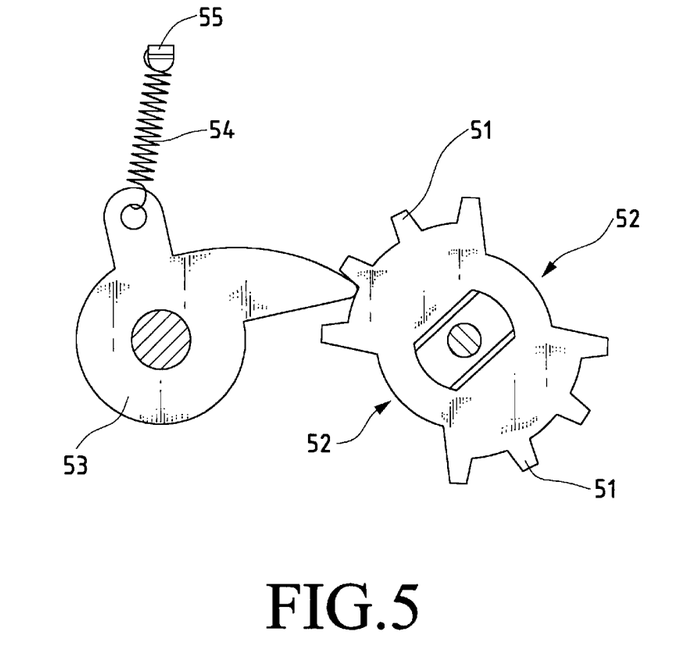
FIG. 5 shows the one-way ratchet of the wire box in a wire-releasing state.
Figure 6:
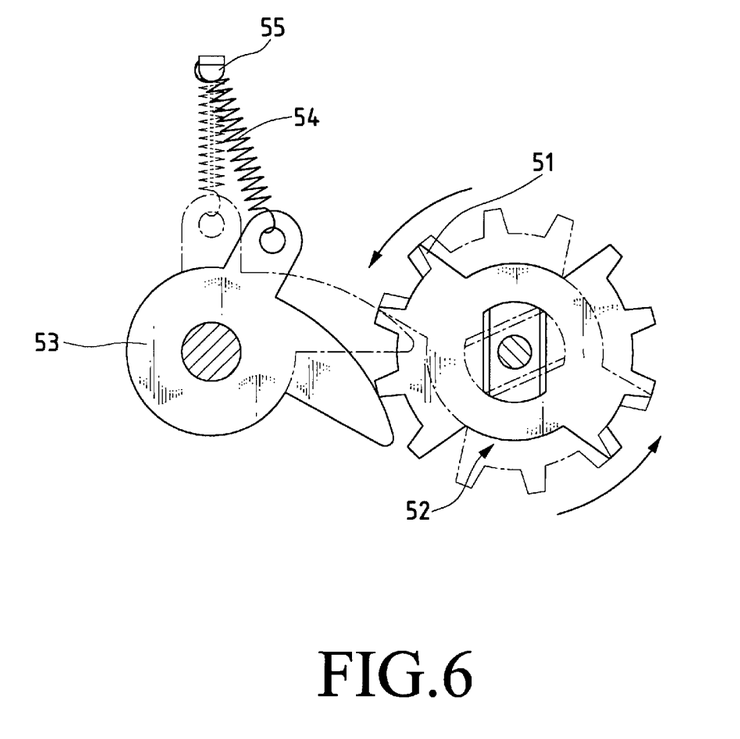
FIG. 6 shows the one-way ratchet of the wire box in a wire-retrieving state.

The wire box 50 is connected with a U-shaped frame 56 with a hanging ring 57 for hanging at a height without occupying room. A ratchet set is disposed on a shaft on one side of a rotary disc 55. Referring to FIG. 5, the opposite sides of the gears of the ratchet set are respectively disposed with continuous teeth 51. Each two adjacent teeth 51 define therebetween a space 52. A movable detent block 53 is disposed beside the gear. A tip of the detent block 53 right abuts against the gear. A spring 54 is hooked on the detent. The other end of the spring 54 is hooked on the rotary disc 55. When pulling out the electric wire, the rotary disc 55 and the gear are synchronously clockwisely rotated, making the detent block 53 engaged with the teeth 51 of the gear to fix the gear and the rotary disc and keep a pulled out length of the electric wire. When retrieving the electric wire, the rotary disc is further rotated (pulling out the electric wire), making the detent block 53 rotated through the space 52 and disengaged from the gear. At this time, the spring in the rotary disc makes the rotary disc counterclockwisely rotated to again wind the pulled out electric wire on the rotary disc 55 until the adjustment ball 60 is stopped by the wire releasing port 58 of the wire box 50 as shown in FIG. 6.

Figure 9:
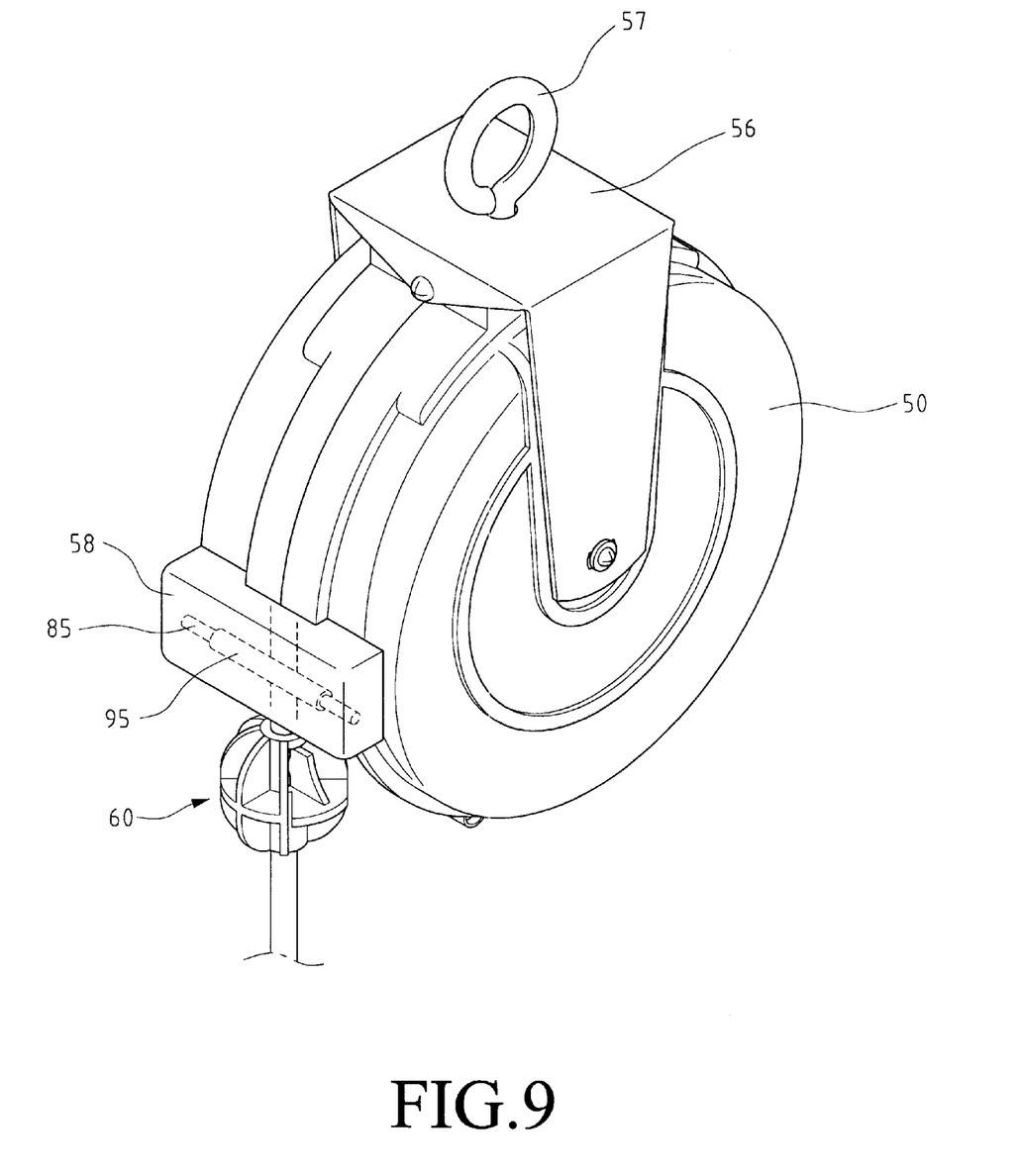
FIG. 9 shows a first embodiment of the wire releasing port of the wire box of the present invention.

Please refer to FIG. 9. According to a first embodiment of the wire releasing port of the wire box, the upper edge of the port 58 is disposed with a pressing rod 85 movably fitted with a long sleeve 95. When the electric wire 19 is released or collected, the skin of the wire 19 is prevented from being scraped by the sharp edge of the wire releasing port 58. Also, the wire can be released or collected more smoothly.

Figure 10:
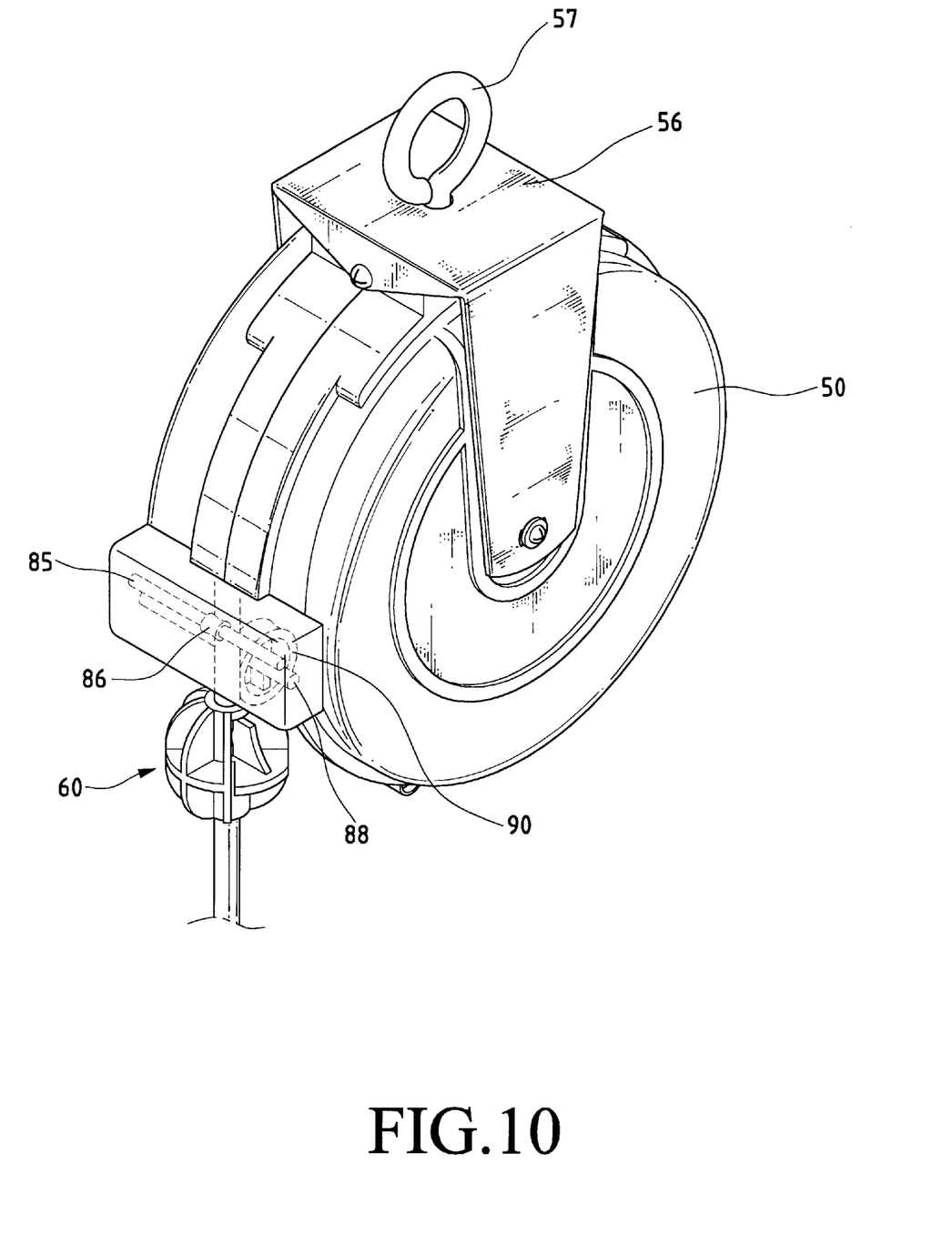
FIG. 10 shows a second embodiment of the wire releasing port of the wire box of the present invention.
Figure 11:
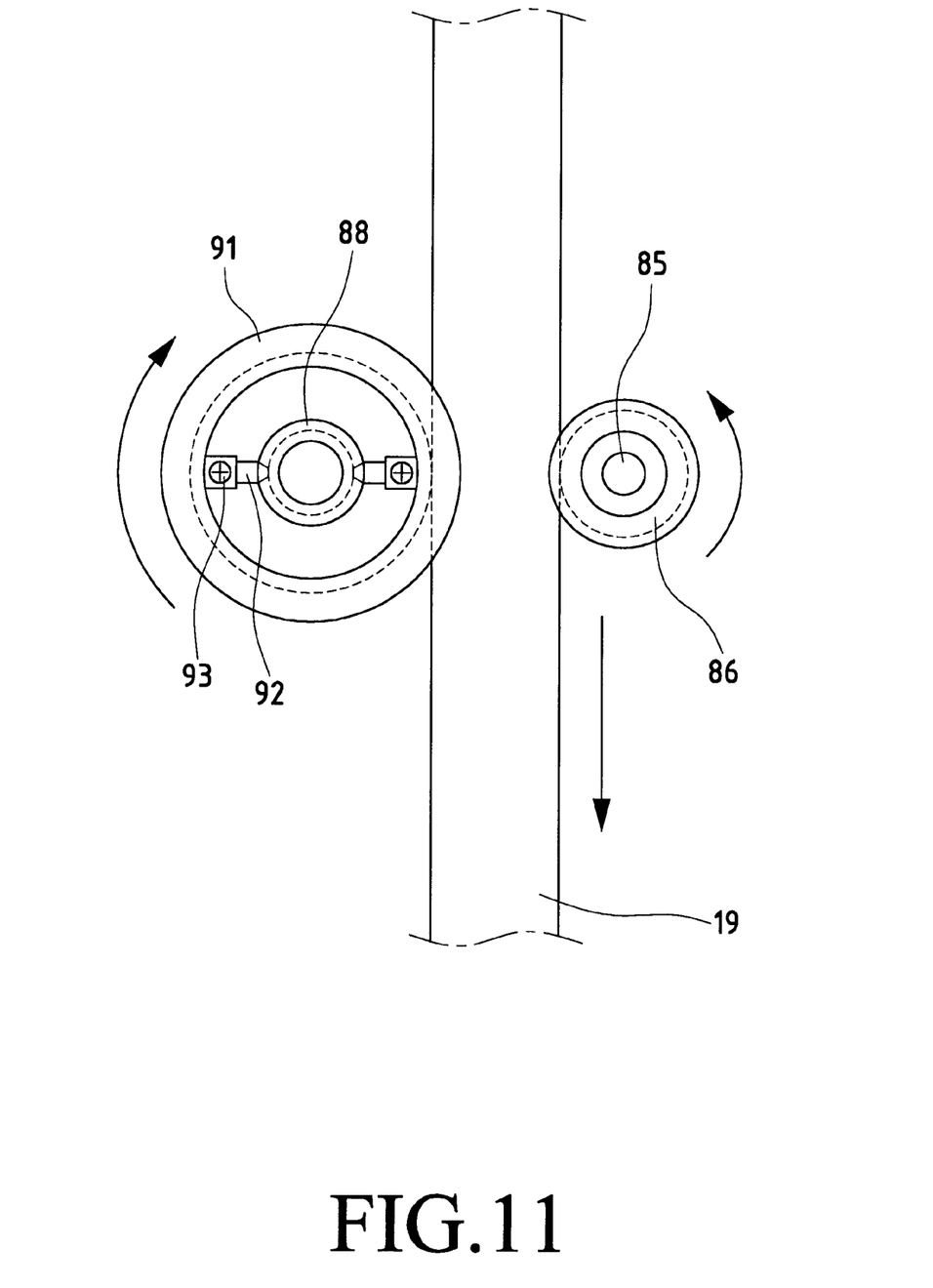
FIG. 11 is a partially sectional view of the wire box of the present invention.
Figure 12:
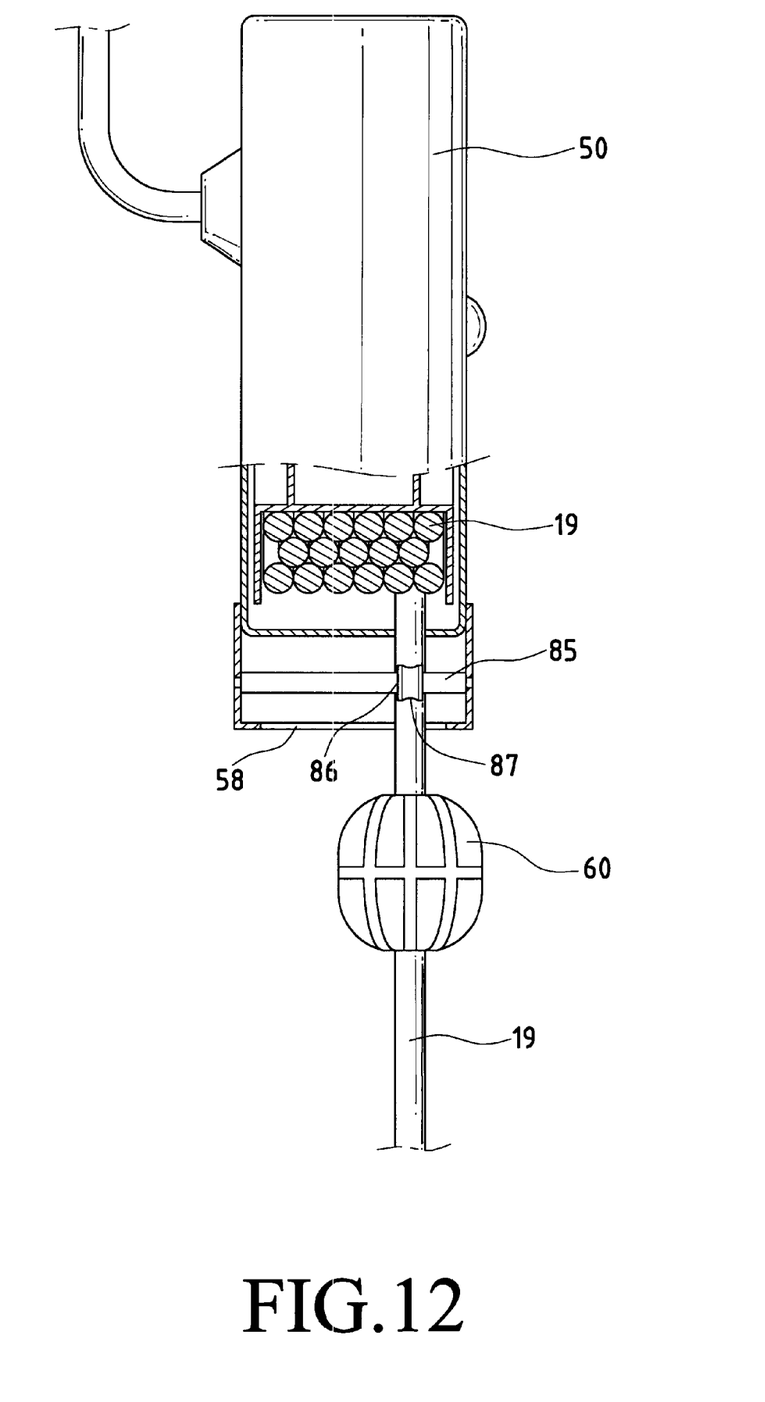
FIG. 12 shows that the wire is released from the wire box.

Please refer to FIGS. 10, 11 and 12. The wire releasing port 58 of the wire box 50 is disposed with a pressing rod 85 and a guide rod 88. A pressing roller 86 is movably fitted on the pressing rod 85. The center of the pressing roller 86 is formed with a concave 87. The guide rod 88 is formed with spirally crossing guide grooves 89. A guide roller 90 is movably fitted on the guide rod 88. The guide roller 90 is connected with a guide block 91 via a screw 93. The top of the guide block 91 is formed with a concave 94 and the bottom of the guide block 91 is disposed with a guide post 92.

Figure 13:
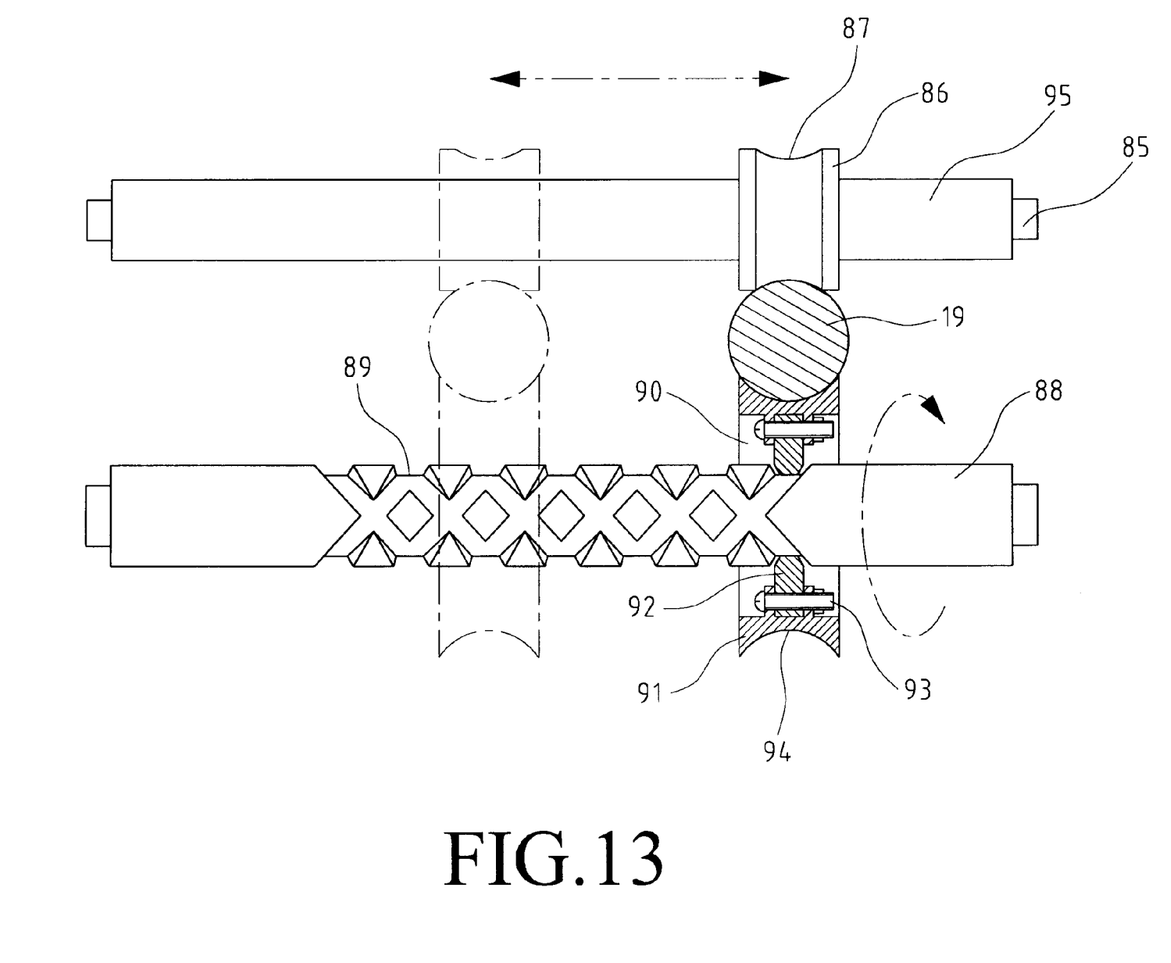
FIG. 13 shows the pressing rod and guide rod of the wire box in a wire releasing or retrieving state.

The electric wire 19 is positioned between the concaves 87, 94 of the pressing roller 86 and the guide roller 90. When pulling out the wire 19, by means of the rolling of the pressing roller 86 and the guide roller 90, the wire 19 can be easily pulled out. The skin of the wire 19 is protected from being scraped by the sharp edge of the wire releasing port 58. When winding the wire 19 into the wire box 50, by means of the guide post 92 in the guide roller 90, the wire 19 is tidily wound into the wire box 50 along the guide groove 89 of the guide rod 88 ( as shown in FIG. 13).

According to the above arrangement, the present invention provides a working lamp able to shade strong light and protect the eyes. The working lamp can be readily taken and used without occupying room. The working lamp can be hung or solely stand to create illuminating effect. The working lamp is shockproof and collisionproof and has prolonged using life. In addition, the skin of the wire of the working lamp is protected from being scraped and the wire can be smoothly released and tidily collected.

It should be noted that the above description and accompanying drawings are only used to illustrate some embodiments of the present invention, not intended to limit the scope thereof Any modification of the embodiments should fall within the scope of the present invention.

What is claimed is:

1. A working lamp which comprises:

A lamp attached to one end of an electric wire, said wire having another end within a wire winding device for winding said electric wire therein;

an adjustment ball made of resilient material through which said electric wire passes, said adjustment ball being located between said wire winding device and said lamp and said adjustment ball including means for positioning said ball along the length of the electric wire between said wire winding device and said lamp;

a wire releasing port attached to said wire winding device through which said wire passes when being wound into said wire winding device;

a pressing rod horizontally mounted in said releasing port, said releasing rod moveably fitted with a sleeve, said sleeve passing through a pressing roller having a concave portion for rotatable contact with said electric wire;

a guide rod horizontally mounted in said releasing port, said guide rod formed with a pair of spirally crossing guide grooves;

a guide roller moveably fitted on said guide rod, said guide roller having a guide post engaged in each of said pair of spirally crossing guide grooves and said guide roller having a concave shaped circumference for engagement with said electric wire whereby said pressing roller and said guide roller are juxtaposed to said electric wire and are in contact therewith so that winding of said wire into said wire winding device causes rotation of said guide roller with consequential reciprocating horizontal movement of said pressing roller, wire and guide roller due to interaction of said guide posts with said pair of spirally crossing guide grooves.

2. The working lamp of claim 1 wherein said wire winding device includes a U shaped frame attached thereto and a hanging ring attached to said frame.

3. The working lamp of claim 2 wherein said lamp comprises a lamp tube situated within a transparent outer tube.

4. The working lamp of claim 3 wherein said lamp includes a shock absorbing base seat at one end, a shock absorbing cap on the other end and a shock absorbing collar between said cap and said seat.

5. The working lamp of claim 4 which further includes a lamp shade around a portion of said outer tube.

6. The working lamp of claim 5 wherein said lamp includes a hanging hook mounted thereon.

7. The working lamp of claim 6 which further includes a socket in the electrical connection with said electric wire.

8. The working lamp of claim 7 which further includes an activation switch thereon for turning said lamp on and off.

9. The working lamp of claim 8 wherein said lamp further includes ventilation means.

* * * * *